(12) United States Patent
Lemmers et al.

(10) Patent No.: US 9,917,490 B2
(45) Date of Patent: Mar. 13, 2018

(54) TAIL CONE GENERATOR WITH INTEGRAL SPEED INCREASING GEARBOX

(71) Applicant: HAMILTON SUNDSTRAND CORPORATION, Charlotte, NC (US)

(72) Inventors: Glenn C. Lemmers, Loves Park, IL (US); Todd A. Spierling, Byron, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 33 days.

(21) Appl. No.: 14/549,896

(22) Filed: Nov. 21, 2014

(65) Prior Publication Data
US 2016/0149469 A1      May 26, 2016

(51) Int. Cl.
| | |
|---|---|
| F02B 63/04 | (2006.01) |
| H02K 7/18 | (2006.01) |
| F01D 15/10 | (2006.01) |
| F01D 25/12 | (2006.01) |
| F01D 25/20 | (2006.01) |
| F02C 7/12 | (2006.01) |
| F02C 7/32 | (2006.01) |
| H02K 7/116 | (2006.01) |

(52) U.S. Cl.
CPC ........... *H02K 7/1823* (2013.01); *F01D 15/10* (2013.01); *F01D 25/12* (2013.01); *F01D 25/20* (2013.01); *F02C 7/12* (2013.01); *F02C 7/32* (2013.01); *H02K 7/116* (2013.01); *F05D 2220/76* (2013.01); *Y02T 50/671* (2013.01); *Y02T 50/675* (2013.01)

(58) Field of Classification Search
CPC ....... H02K 7/1823; F01D 15/10; F01D 25/12; F01D 25/20; F02C 7/12; F02C 7/32

USPC ............................................. 290/1 A; 60/802
See application file for complete search history.

(56) References Cited

U.S. PATENT DOCUMENTS

| | | | | |
|---|---|---|---|---|
| 4,474,001 A | * | 10/1984 | Griffin | F02C 7/16 |
| | | | | 60/204 |
| 5,105,875 A | * | 4/1992 | McArthur | H05K 7/20927 |
| | | | | 123/41.31 |

(Continued)

FOREIGN PATENT DOCUMENTS

EP    2270315    1/2011

OTHER PUBLICATIONS

Extended European Search Report dated Apr. 11, 2016 in European Application No. 15194545.8.

*Primary Examiner* — Tulsidas C Patel
*Assistant Examiner* — Thomas Quigley
(74) *Attorney, Agent, or Firm* — Snell & Wilmer L.L.P.

(57) ABSTRACT

A gas turbine engine is provided, comprising a tail cone and a low-pressure spool outside the tail cone. An input shaft may be coupled to the low-pressure spool and inside the tail cone. A differential may be coupled to the input shaft and inside the tail cone. A generator may be coupled to the differential and also disposed inside the tail cone. An oil pump may be configured to pump oil through the generator to the differential. A generator assembly is also provided. The generator assembly may comprise an input shaft, a differential coupled to the input shaft, a rotating transfer tube coupled to the differential, a generator coupled to rotating transfer tube, and an oil pump configured to pump oil from the generator, through the rotating transfer tube, and into the differential.

14 Claims, 3 Drawing Sheets

(56) References Cited

U.S. PATENT DOCUMENTS

| | | | | |
|---|---|---|---|---|
| 8,905,191 B2* | 12/2014 | Brandt | .................... | F01D 25/18 |
| | | | | 184/6.11 |
| 2006/0005547 A1* | 1/2006 | Brouillet | ................... | F02C 7/12 |
| | | | | 60/802 |
| 2008/0061747 A1* | 3/2008 | Sarlioglu | ................ | H02P 25/08 |
| | | | | 322/11 |
| 2009/0000308 A1* | 1/2009 | Cloft | ........................ | F02C 7/32 |
| | | | | 60/802 |
| 2009/0007569 A1* | 1/2009 | Lemmers, Jr. | .......... | F02C 7/275 |
| | | | | 60/792 |
| 2009/0139243 A1* | 6/2009 | Winter | ...................... | F02C 7/32 |
| | | | | 60/802 |
| 2010/0164428 A1 | 7/2010 | Xu et al. | | |
| 2010/0264759 A1 | 10/2010 | Shafer et al. | | |
| 2010/0303616 A1* | 12/2010 | Chir | ......................... | F02C 6/08 |
| | | | | 415/178 |
| 2010/0326050 A1* | 12/2010 | Schilling | ................ | F01D 15/10 |
| | | | | 60/268 |
| 2011/0203249 A1* | 8/2011 | Telakowski | ............ | F01D 25/18 |
| | | | | 60/39.08 |
| 2011/0298314 A1* | 12/2011 | Atarashi | ................ | B60K 6/405 |
| | | | | 310/54 |
| 2012/0286516 A1* | 11/2012 | Chong | ..................... | H02P 9/48 |
| | | | | 290/52 |

\* cited by examiner

TAIL CONE GENERATOR WITH INTEGRAL SPEED INCREASING GEARBOX

FIELD OF INVENTION

The present disclosure relates to gas turbine engines, and, more specifically, to a generator housed in a tail cone and driven by a low-pressure spool of a gas turbine engine.

BACKGROUND

Gas turbine engines may generate electricity in addition to the motive force they provide. Generators to convert kinetic energy into electricity occupy space and add weight to the aircraft. However, adding weight and consuming onboard space in an aircraft may reduce the overall efficiency of the aircraft.

Generators may typically be driven by the high-pressure spool. The angular velocity of the high-pressure spool may be in a narrow range at high revolutions per minute ("RPM"). For example, a shaft from the high-pressure section of a gas turbine engine may rotate at a speed range with the lowest speed within a ratio of 2 to 1 to the highest speeds (e.g., 10,000 to 20,000 RPM). The narrow range may enable a generator to operate at a desired voltage at the minimum RPM without overloading at the maximum RPM. The high rotational speed of the high-pressure spool may also spin a generator at high RPM and thus enable smaller generators to be employed. However, the high pressure section may not provide enough energy to satisfy the electric demand of the aircraft as well as the desired motive force.

The low-pressure section of a gas turbine engine usually operates at lower speeds with a broader range of speeds than the high-pressure section. For example, a shaft from a low pressure section may rotate at a higher ratio of speed ranges (e.g., 5 to 1). Low input speeds and high ranges of speeds may present difficulties when designing a generator that will not overload at the high RPMs. Lower input speeds may thus translate to higher weight and larger volume generators. Larger generators in an aircraft may result in reduced aircraft efficiency.

SUMMARY

A gas turbine engine is provided, comprising a tail cone and a low-pressure spool outside the tail cone. An input shaft may be coupled to the low-pressure spool and inside the tail cone. A differential may be coupled to the input shaft and inside the tail cone. A generator may be coupled to the differential and also disposed inside the tail cone. An oil pump may be configured to pump oil through the generator to the differential.

In various embodiments, the differential may comprise an epicyclic differential. The epicyclic differential may comprise an output to input ratio greater than or equal to 3 to 1. The generator may comprise a permanent magnet generator. The generator may also comprise a salient pole generator. A permanent magnet generator may provide current to a winding of the salient pole generator. A rotating transfer tube may be coupled between the generator and the differential with the rotating transfer tube configured to transfer the oil from the generator to the differential.

A generator assembly is also provided. The generator assembly may comprise an input shaft, a differential coupled to the input shaft, a rotating transfer tube coupled to the differential, a generator coupled to rotating transfer tube, and an oil pump configured to pump oil from the generator, through the rotating transfer tube, and into the differential.

In various embodiments, the generator may further comprise a permanent magnet generator. The generator may also comprise a salient pole generator. A permanent magnet generator may provide current to a winding of the salient pole generator. The differential may comprise an epicyclic differential. The epicyclic differential may have an output to input ratio greater than or equal to 2. A tail cone may house the generator and the differential. The input shaft can be configured to be coupled to a low-pressure spool.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine or generator. As used herein, "proximal" refers to a direction radially inward, or generally, towards the axis of rotation of a turbine engine or generator.

Figure 1:
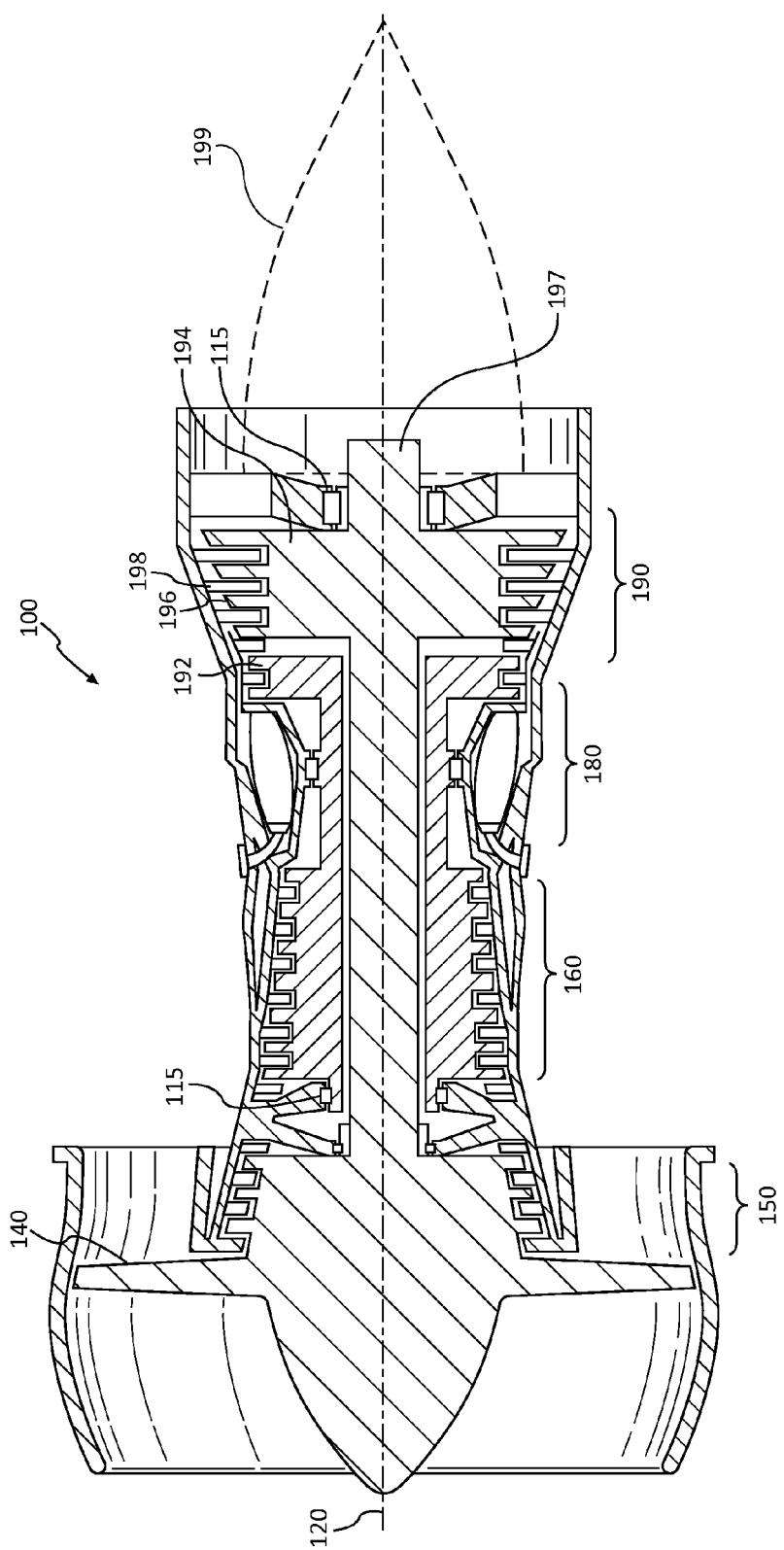
FIG. 1 illustrates a cross-sectional view of an exemplary gas turbine engine, in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and a turbine section 190. Air compressed in compressor sections 150, 160 may be mixed with fuel and burned in combustion section 180 and expanded across turbine section 190. Turbine section 190 may include high-pressure rotors 192 and low-pressure rotors 194, which rotate in response to the expansion. The rotating low-pressure rotors 194 may in turn rotate low-pressure spool 197. Turbine section 190 may comprise alternating rows of rotary airfoils or blades 196 and static airfoils or vanes 198. A plurality of bearings 115 may support spools in the gas turbine engine 100.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow. Tail cone 199 may be aft of turbine section 190. Tail cone 199 may be used to house a generator, for example. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

Figure 2:
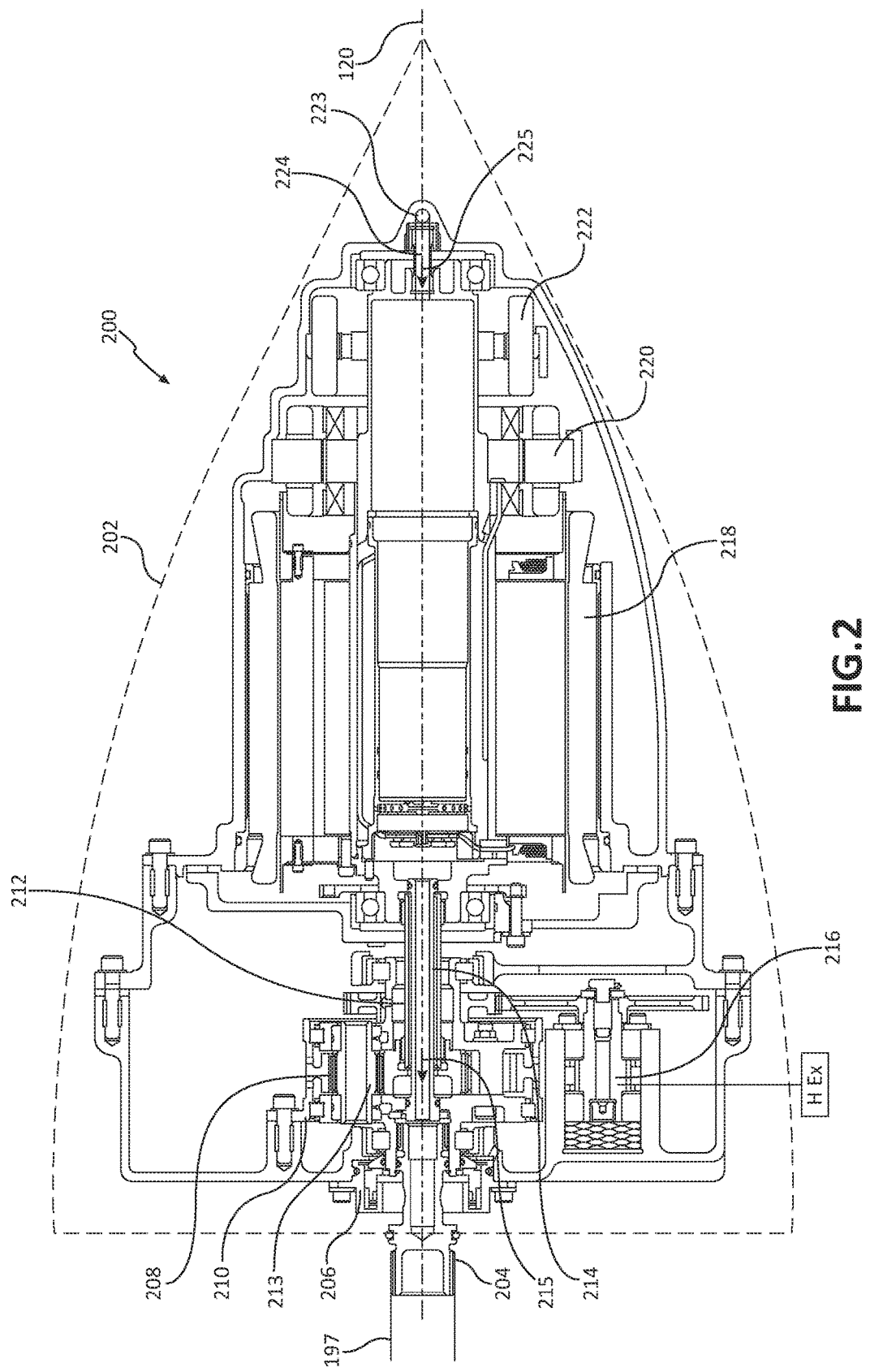
FIG. 2 illustrates a generator assembly including salient pole generator housed in a tail cone of a gas turbine engine.

With reference to FIG. 2, a generator assembly 200 is shown including a tail cone 202 to house the generator assembly, in accordance with various embodiments. Generator assembly 200 may comprise a salient pole generator 218. In that regard, generator assembly 200 may output a regulated voltage across a range of operating speeds. Input shaft 204 may be coupled to the low-pressure spool 197, which is coupled to the low-pressure turbine and low-pressure compressor (as illustrated in FIG. 1) to provide rotational energy for conversion to electricity by salient pole generator 218. Thus, input shaft 204 may rotate at the same speed as low-pressure spool 197. For example, the low pressure spool may rotate at between 2,000 to 10,000 RPM and cause input shaft 204 to rotate at 2,000 to 10,000 RPM about axis of rotation 120. Input seal 206 may be disposed radially outward from input shaft 204. Input seal 206 may be a dynamic seal (i.e., for a rotating shaft sealing against a stationary member) that keeps oil from leaking out the generator.

In various embodiments, input shaft 204 may be mechanically coupled to epicyclic differential 208. Epicyclic differential 208 may be a planetary gearbox comprising a grounded ring gear 210, planet gear 211, and sun gear 213. Epicyclic differential 208 have an input mechanically coupled between input shaft 204 and an output mechanically coupled to a spline shaft 212. Epicyclic differential 208 may take the rotational speed of input shaft 204 and increase the angular velocity to a desired output angular velocity. For example, epicyclic differential 208 may have an output/input ratio of approximately 3.5 to 1. For example, the epicyclic differential may comprise a 31 tooth sun, a 17 tooth planet, and a 65 tooth ring (for a 3.0968 to 1 ratio). In various embodiments, epicyclic differential 208 may have an output/input ratio of approximately 6 to 1. The output/input ratio of epicyclic differential 208 may be adjusted to convert the operating RPM range of low-pressure spool 197 (of FIG. 1) into the desired operating RPM range of salient pole generator 218.

In various embodiments, spline shaft 212 may be coupled to rotor of salient pole generator 218. The rotor may rotate at a speed of the output of epicyclic differential 208. Exciter 220 may be electrically coupled to the windings of salient pole generator 218. Exciter may provide current to the windings to generate the desired magnetic field. Permanent magnet generator (PMG) 222 may also be coupled to the output of epicyclic differential 208 to provide current used in exciter 220. A generator control unit may receive electricity generated by PMG 222 and control the current sent into exciter 220 to regulate the output voltage of salient pole generator 218 (and of generator assembly 200). In that regard, generator assembly 200 may be a self-contained system capable of generating electrical power absent an external electrical power source to drive exciter 220. Generator assembly 200 may also have power production turned off while rotor rotates by turning off exciter 220 so that no magnetic field is generated in the windings of salient pole generator 218.

In various embodiments, generator assembly 200 may comprise lube and scavenge pump 216 (i.e., an oil pump). Lube and oil scavenge pump 216 may comprise one or more pumps configured to move oil. Lube and scavenge pump 216 may pump oil throughout generator assembly 200 to provide cooling and lubrication. Lube and scavenge pump 216 may be driven by input shaft 204 via gearing. Lube and scavenge pump may pump oil through core 223 into rotating transfer tube 224 with oil flowing in direction 225. Oil from rotating transfer tube 224 may cool the inner diameter of the rotor shaft, the windings on the rotor, and the main stator of salient pole generator 218. Oil may continue through rotating transfer tube 214 in direction 215 at the other end of the rotor to cool and lubricate epicyclic differential 208 and internal bearings supporting the planet gears and gear meshes. In that regard, epicyclic differential 208 is downstream from (i.e., receives oil from) the rotor of salient pole generator 218 with oil flowing through salient pole generator 218 into epicyclic differential 208. Oil may be cooled in a heat exchanger external to the tail cone 202 and in the airstream of the aircraft.

Figure 3:
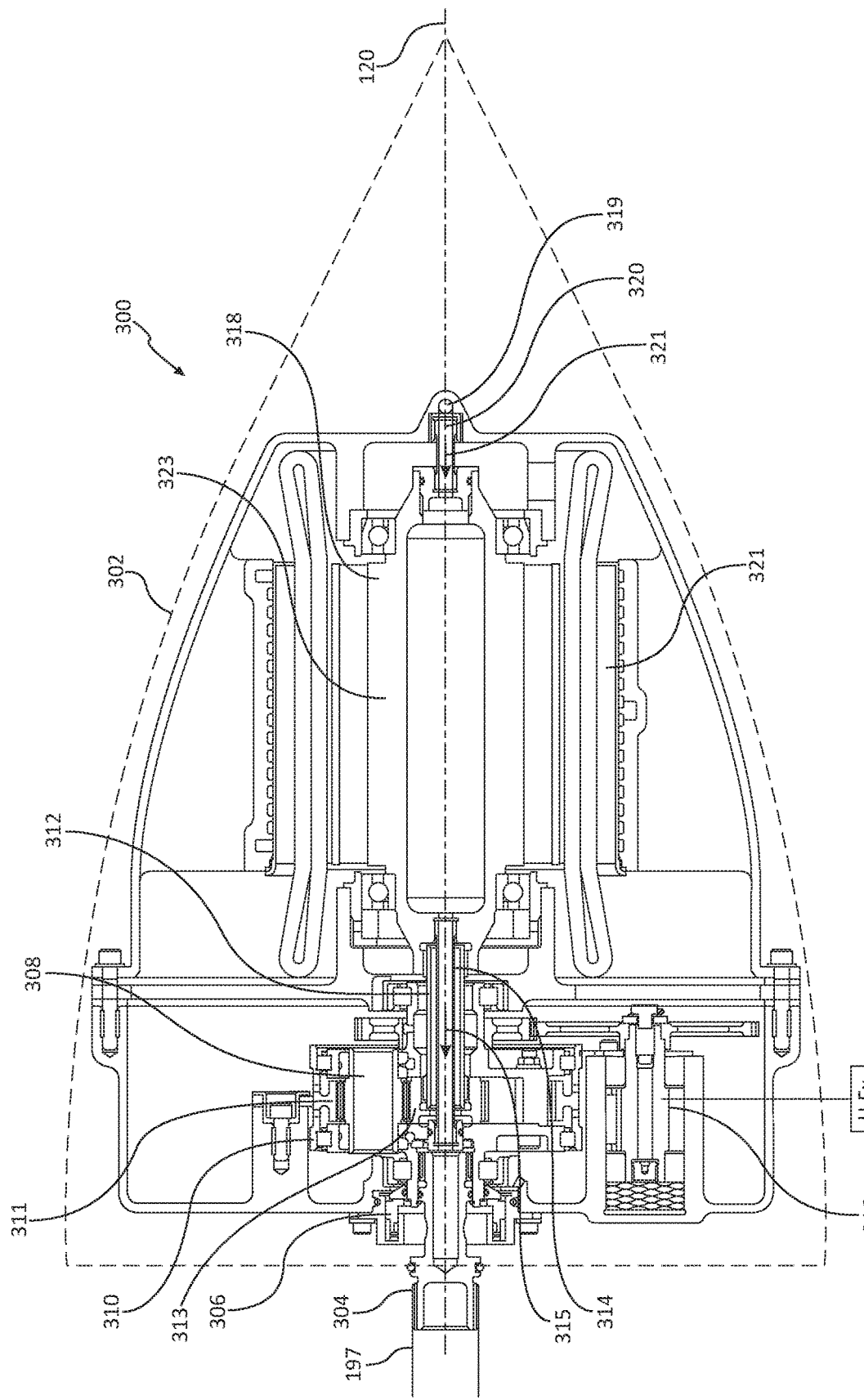
FIG. 3 illustrates a generator assembly including a permanent magnet generator housed in a tail cone of a gas turbine engine.

With reference to FIG. 3, a generator assembly 300 comprising a tail cone 302 to house the generator assembly is shown, in accordance with various embodiments. Generator assembly 300 may comprise a PMG 318 with stator 321 disposed radially outward from rotor 323. Rotor 323 may be configured to rotate about axis of rotation 120 with a permanent magnet integrated into rotor 323. Generator assembly 300 may output a varying voltage across a range of operating speeds as the magnetic field generated by the permanent magnet of rotor 323 may not vary in strength. Input shaft 304 may be coupled to the low-pressure spool 197 that is coupled to the low-pressure turbine and low-pressure compressor (as illustrated in FIG. 1) to provide rotational energy for conversion to electricity by generator assembly 300. Thus, input shaft 304 may rotate at the same speed as low-pressure spool 197. For example, the low pressure spool may rotate at 2,000 to 10,000 RPM and cause input shaft 304 to rotate at 2,000 to 10,000 RPM around axis of rotation 120. Input seal 306 may be disposed radially outward from input shaft 304.

In various embodiments, input shaft 304 may be mechanically coupled to epicyclic differential 308. Epicyclic differential 308 may be a planetary gearbox comprising a grounded ring gear 310, planet gear 311, and sun gear 313. Epicyclic differential 308 may be mechanically coupled between input shaft 304 and spline shaft 312. Epicyclic differential 308 may take the rotational speed of input shaft 304 and increase the angular velocity to a desired output angular velocity. For example, epicyclic differential 308 may have an output/input ratio of approximately 3.0 to 1. For example, the epicyclic differential may comprise a 28 tooth sun, a 23 tooth planet, and a 74 tooth ring (for a 3.6429 to 1 output/input ratio). In various embodiments, epicyclic differential 308 may have an output/input greater than or equal to 2 to 1. The output/input ratio of epicyclic differential 308 may be adjusted to convert the operating RPM range of low-pressure spool 197 (of FIG. 1) into the desired operating RPM range of generator assembly 300 by adjusting the number of teeth on the sun, planet, and ring gears.

In various embodiments, spline coupling shaft may be coupled to rotor 323 of PMG 318. Rotor 323 and the permanent magnet may rotate at a speed of the output of epicyclic differential 308. PMG 318 may operate without an exciter to provide current for a magnetic field since the permanent magnet creates a magnetic field. The output voltage produced by PMG 318 may vary with the rotational speed of rotor 323 and may not be turned off while input shaft 304 is rotating. In that regard, generator assembly 300 may require a transformer external to tail cone 302 to regulate the variable voltage produced by generator assembly 300.

In various embodiments, generator assembly 300 may comprise lube and scavenge pump 316. Lube and oil scavenge pump 316 may comprise one or more pumps configured to move oil. Lube and scavenge pump 316 may pump oil throughout generator assembly 300 to provide cooling and lubrication. Lube and scavenge pump 316 may be driven by input shaft 304 through gearing. Lube and scavenge pump may pump oil through core 319 into rotating transfer tube 320 in direction 321. Oil from rotating transfer tube 320 may cool the inner diameter of rotor 323 and the magnet of PMG 318. Oil may flow out of rotor 323 and into rotating transfer tube 314 in direction 315 to cool and lubricate epicyclic differential 308 and internal bearings supporting the planet gears and gear meshes. In that regard, epicyclic differential 308 is downstream from (i.e., receives oil from) rotor 323 of PMG 318 with respect to oil flowing through PMG 318 into epicyclic differential 308. Oil may be cooled in a heat exchanger external to tail cone 302 and in the airstream of the aircraft.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine, comprising:
   a tailcone;
   a low-pressure spool at least partially outside the tailcone;
   an input shaft coupled to the low-pressure spool and at least partially inside the tailcone;
   a differential coupled to the input shaft and disposed inside the tailcone; wherein the differential is aft of the input shaft;
   a generator coupled to the differential and disposed inside the tailcone;
   an oil pump disposed radially outward from the differential and configured to pump oil through the generator along an axis of rotation to the differential with the oil pump, the differential, and the generator disposed completely inside the tailcone; and
   a heat exchanger in operable connection with the oil pump and disposed in an airstream external to the tailcone.

2. The gas turbine engine of claim 1, wherein the differential comprises an epicyclic differential.

3. The gas turbine engine of claim 2, wherein the epicyclic differential comprises an output to input ratio greater than or equal to 3 to 1.

4. The gas turbine engine of claim 1, wherein the generator comprises a permanent magnet generator.

5. The gas turbine engine of claim 1, wherein the generator comprises a salient pole generator.

6. The gas turbine engine of claim 5, further comprising a permanent magnet generator configured to provide current to a winding of the salient pole generator.

7. The gas turbine engine of claim 1, further comprising a rotating transfer tube coupled between the generator and the differential, wherein the rotating transfer tube is configured to transfer the oil from the generator to the differential.

8. A generator assembly, comprising:
an input shaft;
a differential coupled to the input shaft and disposed inside a tailcone;
a rotating transfer tube coupled to the differential and disposed inside the tailcone;
a generator coupled to rotating transfer tube and disposed inside the tailcone;
an oil pump configured to pump oil from the generator, through the rotating transfer tube, and into the differential with the oil pump disposed inside the tailcone and radially outward from at least one of the differential or the rotating transfer tube; and
a heat exchange in operable connection with the oil pump and disposed in an airstream external to the tailcone.

9. The generator assembly of claim 8, wherein the generator further comprises a permanent magnet generator.

10. The generator assembly of claim 8, wherein the generator comprises a salient pole generator.

11. The generator assembly of claim 10, further comprising a permanent magnet generator configured to provide current to a winding of the salient pole generator.

12. The generator assembly of claim 8, wherein the differential comprises an epicyclic differential.

13. The generator assembly of claim 12, wherein the epicyclic differential comprises an output to input ratio greater than or equal to 2 to 1.

14. The generator assembly of claim 8, wherein the input shaft is configured to be driven by a low-pressure spool.

* * * * *

UNITED STATES PATENT AND TRADEMARK OFFICE
CERTIFICATE OF CORRECTION

PATENT NO.        : 9,917,490 B2
APPLICATION NO.   : 14/549896
DATED             : March 13, 2018
INVENTOR(S)       : Glenn C Lemmers and Todd A Spierling Page 1 of 1

It is certified that error appears in the above-identified patent and that said Letters Patent is hereby corrected as shown below:

In the Claims

Column 6
In Claim 1 Line 51 delete "disposed" and insert therefore -- disposed completely --
In Claim 1 Line 54 delete "disposed" and insert therefore -- disposed completely --

Signed and Sealed this
Twenty-first Day of August, 2018

Andrei Iancu
*Director of the United States Patent and Trademark Office*